(12) United States Patent
Sakai et al.

(10) Patent No.: US 6,500,223 B1
(45) Date of Patent: Dec. 31, 2002

(54) GRANULAR FERTILIZER COATED WITH DECOMPOSABLE COATING FILM AND PROCESS FOR PRODUCING THE SAME

(75) Inventors: Yuichi Sakai, Kawasaki; Keishi Tada, Yokosuka; Hiroyuki Kobayashi, Inagi, all of (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 09/367,385

(22) PCT Filed: Feb. 19, 1998

(86) PCT No.: PCT/JP98/00686

§ 371 (c)(1),
(2), (4) Date: Aug. 13, 1999

(87) PCT Pub. No.: WO98/37039

PCT Pub. Date: Aug. 27, 1998

(30) Foreign Application Priority Data

Feb. 19, 1997 (JP) .................................... 9-035228
Jun. 27, 1997 (JP) .................................... 9-172284

(51) Int. Cl.$^7$ ............................................ C05G 5/00
(52) U.S. Cl. ................... 71/64.07; 71/64.02; 71/64.11
(58) Field of Search .................... 71/64.01, 64.02, 71/64.07, 64.11

(56) References Cited

U.S. PATENT DOCUMENTS

| 3,295,950 A | 1/1967 | Blouin et al. | |
|---|---|---|---|
| 3,372,019 A | 3/1968 | Fox | |
| 5,645,624 A | * 7/1997 | Naka et al. | ................. 71/64.07 |

FOREIGN PATENT DOCUMENTS

| CA | 7 58968 | 5/1967 |
|---|---|---|
| EP | 10661250 | 7/1995 |
| EP | 255160 A | 2/1998 |
| EP | 255752 A | 2/1998 |
| GB | 1 485812 | 9/1977 |
| GB | 2259698 | 3/1993 |
| JP | 5099858 | 8/1975 |
| JP | 5590495 | 7/1980 |
| JP | 55167197 | 12/1980 |
| JP | 5626797 | 3/1981 |
| JP | 56026797 | 3/1981 |
| JP | 2 5037074 | 8/1985 |
| JP | 2 223516 | 5/1990 |
| JP | 2 223517 | 5/1990 |
| JP | 3146492 | 6/1991 |
| JP | 5201786 | 8/1993 |
| JP | 6144981 | 5/1994 |
| JP | 733576 | 2/1995 |
| JP | 733577 | 2/1995 |
| JP | 748198 | 2/1995 |
| JP | 2 791143 | 10/1995 |
| JP | 7315976 | 12/1995 |
| JP | 859382 | 3/1996 |
| JP | 8333185 | 12/1996 |
| JP | 9263476 | 10/1997 |

OTHER PUBLICATIONS

Hackh's *Chemical Dictionary* (Fourth Edition), McGraw-Hill Book Company (1969), p. 534. (No month).*

* cited by examiner

*Primary Examiner*—Wayne Langel
(74) *Attorney, Agent, or Firm*—Birch, Stewart, Kolasch & Birch, LLP (57) ABSTRACT

A coated granular fertilizer which comprises a degradable film containing 10% by weight or more of a polyolefin and/or petroleum wax having a weight-average molecular weight of 300–10,000 and an inorganic filler and/or a surface active agent and a granular fertilizer coated with said degradable film.

9 Claims, 2 Drawing Sheets

GRANULAR FERTILIZER COATED WITH DECOMPOSABLE COATING FILM AND PROCESS FOR PRODUCING THE SAME

This application is the national phase under 35 U.S.C. §371 of PCT International Application No. PCT/JP98/00686 which has an International filing date of Feb. 19, 1998, which designated the United States of America.

TECHNICAL FIELD

The present invention relates to a coated granular fertilizer comprising fertilizer particles the surface of which is coated with resins or inorganic materials, and, particularly, to a coated granular fertilizer coated with a film high in degradability in the natural environment.

BACKGROUND ART

Hitherto, the following techniques are known for obtaining fertilizers of slow activity.

The first is a technique to control release of fertilizer ingredients by chemical reaction having a specific reaction rate as represented by chemically slow active fertilizers such as CDU complex fertilizers and IB complex fertilizers.

The second is a technique to control release of the fertilizer from inside of the particles by coating the surface of fertilizer particles with a specific film.

Some films have hitherto been known. First, mention may be made of films mainly composed of sulfur. However, sulfur has the defect that it causes acidification of the soil and is considerably low in mechanical strength. Secondly, mention may be made of alkyd resins. However, alkyd resins are also low in mechanical strength, specially in shock resistance and abrasion resistance, and, as a result, a satisfactory slow action, namely, release controllability, cannot be obtained. Thirdly, mention may be made of urethane resins. Urethane resins are relatively high in mechanical strength, but they have problems in production and cost. Fourthly, mention may be made of polyolefin resins as disclosed in JP-B-60-37074. These resins are superior in mechanical strength and also in release properties, but are not necessarily satisfactory in degradability of the films in the natural environment after the release of fertilizer.

In addition to these techniques, various attempts have recently been made to provide coated fertilizers which do not leave films is the soil after release of fertilizer because the films undergo biodegradation or photodegradation in the natural environment and, furthermore, which can be satisfactorily controlled in release of fertilizer into soil. U.S. Pat. No. 3,295,950 discloses a technique according to which sulfur is used as a coating material and the surface of the coated fertilizer is further sealed by a wax. However, as mentioned in JP-A-55-167197, this technique has problems in that the film is fragile and can hardly control the release of fertilizer. Furthermore, the wax used for sealing is degraded by microorganisms relatively soon so as to cause a great change in develop- ment of the effect of the fertilizer depending on the soil conditions. Moreover, U.S. Pat. No. 3,372,019 and Canadian Patent No. 758,968 discloses coated fertilizers prepared using a molten mixture of a wax and an ethylene-vinyl acetate copolymer. However, these techniques are insufficient in the control of release properties. Additionally, inhibition of early release and control of release over a long time are difficult.

As techniques utilizing photodegradable films, techniques are known which use as a coating agent a vinyl resin containing an organometallic complex as disclosed in JP-B-7-91143, and techniques which use as a coating material a photodegradable copolymer such as ethylene-carbon monoxide copolymer or ethylene-vinyl acetate-carbon monoxide copolymer as disclosed in JP-B-2-23516, and techniques which use as a coating agent an amorphous polyolefin obtained by copolymerizing propylene, ethylene, and/or butene-1 as disclosed in JP-A-8-59382. These techniques, however, have a defect in that most of the films do not degrade in the soil which does not get light.

As techniques utilizing biodegradable films, JP-B-2-23517 discloses use of poly-3-hydroxy-3-alkylpropionic acid, JP-A-3-146492 discloses use of polycaprolactone, JP-A-7-315976 discloses use of aliphatic polyesters, and JP-A-7-33577 discloses use of polylactic acid. However, in these techniques, when the content of the biodegradable resins used, such as poly-3-hydroxy-3-alkylpropionic acid, polycaprolactone, aliphatic polyesters, and polylactic acid, is high, the releasing speed is too high due to the increase of hydrophilicity of the films. Additionally, degradation of the films occurs during the releasing period. Therefore, degradable film-coated granular fertilizers, the release of which is completed in a short period of time, can be obtained. But degradable film-coated granular fertilizers, the release of which is prolonged for a long period of time, cannot be obtained. On the other hand, when the content of the biodegradable resins is low, controllability of the release is good, but degradability of the film is insufficient. Furthermore, JP-A-7-33576 discloses a technique of coating, with a biodegradable resin such as polycaprolactone and a film material such as a low-molecular weight polyethylene or a wax, to form a multilayer film. However, the mechanical strength of the film is low, and inhibition of early release is insufficient.

As mentioned above, the conventional techniques do not simultaneously satisfy the controllability of release, the mechanical strength of the film, and the degradability of the film.

The object of the present invention is to provide a degradable film-coated granular fertilizer which is excellent in mechanical strength of the film, satisfactory in inhibition of early release and can be controlled in release for a long period of time, and whose film after the release of fertilizer is degraded in a natural environment, and to provide a method for producing the same.

DISCLOSURE OF INVENTION

As a result of intensive research conducted by the inventors, it has been found that the above problems can be solved by a coated granular fertilizer which is coated with a film containing a specific amount of a polyolefin and/or petroleum wax having a specific weight-average molecular weight and an inorganic filler and/or a surface active agent. Thus, the present invention has been accomplished.

The present invention is as follows.

(1) A coated granular fertilizer which comprises a degradable film containing 10% by weight or more of a polyolefin and/or petroleum wax having a weight-average molecular weight of 300–10,000 and an inorganic filler and/or a surface active agent and a granular fertilizer coated with said degradable film.

(2) A coated granular fertilizer according to the above (1) which is coated with a degradable film containing 10–95% by weight of a polyolefin and/or petroleum wax having a weight-average molecular weight of 300–10,000 and 5–80% by weight of an inorganic filler.

(3) A coated granular fertilizer according to the above (1) which is coated with a degradable film containing 10–99.99% by weight of a polyolefin and/or petroleum wax having a weight-average molecular weight of 300–10,000 and 0.01–20% by weight of a surface active agent.

(4) A coated granular fertilizer according to the above (1) which is coated with a degradable film containing 10–94.99% by weight of a polyolefin and/or petroleum wax having a weight-average molecular weight of 300–10,000, 5–80% by weight of an inorganic filler and 0.01–20% by weight of a surface active agent.

(5) A coated granular fertilizer according to the above (1) which is coated with a degradable film containing 10% by weight or more of a polyolefin and/or petroleum wax having a weight-average molecular weight of 300–10,000, an ethylene-vinyl acetate copolymer and/or an ethylene-α-olefin copolymer having a weight-average molecular weight of 20,000 or more, a ratio of weight-average molecular weight to number-average molecular weight of 1–3 and a density of 0.8–0.9 g/cm$^3$, and an inorganic filler and/or a surface active agent, the weight ratio of the ethylene-vinyl acetate copolymer and/or ethylene-α-olefin copolymer to the polyolefin and/or petroleum wax being 0.01–2.0.

(6) A coated granular fertilizer according to the above (5) which is coated with a degradable film containing 10–94% by weight of a polyolefin and/or petroleum wax having a weight-average molecular weight of 300–10,000, 1–60% by weight of an ethylene-vinyl acetate copolymer and/or an ethylene-α-olefin copolymer having a weight-average molecular weight of 20,000 or more, a ratio of weight-average molecular weight to number-average molecular weight of 1–3 and a density of 0.8–0.9 g/cm$^3$, and 5–80% by weight of an inorganic filler.

(7) A coated granular fertilizer according to the above (5) which is coated with a degradable film containing 10–98.99% by weight of a polyolefin and/or petroleum wax having a weight-average molecular weight of 300–10,000, 1–60% by weight of an ethylene-vinyl acetate copolymer and/or an ethylene-α-olefin copolymer having a weight-average molecular weight of 20,000 or more, a ratio of weight-average molecular weight to number-average molecular weight of 1–3 and a density of 0.8–0.9 g/cm$^3$, and 0.01–20% by weight of a surface active agent.

(8) A coated granular fertilizer according to the above (5) which is coated with a degradable film containing 10–93.99% by weight of a polyolefin and/or petroleum wax having a weight-average molecular weight of 300–10,000, 1–60% by weight of an ethylene-vinyl acetate copolymer and/or an ethylene-α-olefin copolymer having a weight-average molecular weight of 20,000 or more, a ratio of weight-average molecular weight to number-average molecular weight of 1–3 and a density of 0.8–0.9 g/cm$^3$, 5–80% by weight of an inorganic filler, and 0.01–20% by weight of a surface active agent.

(9) A coated granular fertilizer according to the above (1) which is coated with a degradable film containing 10% by weight or more of a polyolefin having a weight-average molecular weight of 300–10,000 and an inorganic filler and/or a surface active agent.

(10) A coated granular fertilizer according to the above (9), wherein the polyolefin is a polyethylene.

(11) A coated granular fertilizer according to the above (5) which is coated with a degradable film containing 10–93.99% by weight of a polyethylene having a weight-average molecular weight of 630–10,000, 1–47.5% by weight of an ethylene-vinyl acetate copolymer, 5–80% by weight of an inorganic filler, and 0.01–20% by weight of a surface active agent, the weight ratio of the ethylene-vinyl acetate copolymer to the polyethylene being 0.05–1.0.

(12) A coated granular fertilizer according to the above (1), wherein the film contains 0.5–20% by weight of at least one biodegradable material selected from the group consisting of starch, modified starch, cereal powder, cellulose, agar, and xanthone.

(13) A coated granular fertilizer according to the above (1), wherein the film contains a photodegradation accelerator comprising an organometallic complex containing at least one metal selected from the group consisting of iron, cobalt, nickel, copper, manganese, silver, palladium, molybdenum, chromium, tungsten and cerium, and/or an oxidative degradation accelerator consisting of at least one member selected from the group consisting of a compound having a —C=C— unsaturated bond, a transition metal and a transition metal compound.

(14) A coated granular fertilizer according to the above (13), wherein the organometallic complex is nickel dibutyldithiocarbamate and/or nickel diethyldithiocarbamate and/or an acetylacetone complex of iron, and the film contains the organometallic complex in an amount of 0.02–20×10$^{-6}$ mole/g based on the film.

(15) A method for producing the coated granular fertilizer according to any one of the above (1)–(14) which comprises a step of supplying a dispersion, solution or melt containing film-constituting ingredients in the form of spray to a granular fertilizer in a fluid or tumbled state to form a film on the surface of the granular fertilizer.

(16) A method for producing the coated granular fertilizer according to the above (15) which comprises a step of supplying a dispersion or solution containing the film constituting ingredients in the form of spray to a granular fertilizer in a fluid or tumbles state to form a film on the surface of the granular fertilizer.

BEST MODE FOR CARRYING OUT THE INVENTION

The polyolefins used in the present invention include high-density or low-density polyethylene, polypropylene, ethylene-propylene copolymer, polybutene, butene-ethylene copolymer, butene-propylene copolymer, etc. Among them, polyethylene and polypropylene can be suitably used, and polyethylene can be most suitably used because it is excellent in biodegradability. As polyolefins, there may be used those which are obtained by usual polymerization reaction, and also those which are obtained by subjecting high-molecular weight polyolefins to heat decomposition or oxidative decomposition to make them low in molecular weight. Furthermore, polyolefins modified with a slight amount of functional groups, such as a carboxyl group, can also be used.

The petroleum waxes used in the present invention include petroleum waxes such as paraffin wax, microcrystalline wax, petrolatum, etc. Paraffin wax and microcrystalline wax are especially preferred. The melting point of the petroleum waxes is preferably 50–120° C. If the melting point is lower than 50° C., there is a problem of adhesion at the time of coating, and those of higher than 120° C. are commercially available with difficulty.

These polyolefins and/or petroleum waxes may be used each alone or in admixture of two or more of them, respectively. However, polyolefins are preferred from the viewpoint that they are not too high and are proper in biodegradation rate and are higher in the mechanical strength of films, and polyethylene is most suitable. In this case, polyethylene may contain a small amount of other monomers as comonomers, as long as the effect is not damaged.

In the present invention, it is necessary that these polyolefins and petroleum waxes have a weight-average molecular weight of 300–10,000. If the weight-average molecular weight is less than 300, the biodegradation rate of the film in the soil is high, and there is the possibility of the film being degraded during the releasing period of the fertilizer. Furthermore, owing to the deterioration in film strength, the release control becomes difficult. If the molecular weight is more than 10,000, degradability of the film after completion of the release is insufficient. From the point of balancing between proper biodegradation rate and mechanical strength of the film, the molecular weight is preferably 630–10,000, more preferably 630–8,000, further preferably 630–5,100, most preferably 630–3,000. The weight-average molecular weight in the present invention is measured by gel permeation chromatography (GPC). Content of the polyolefins and/or petroleum waxes having a weight-average molecular weight of 300–10,000 is 10% by weight or more based on the whole film. If the content is lower than 10% by weight, degradability of the film is insufficient. From the point of degradability of the film, the content is preferably 20–95% by weight, more preferably 30–95% by weight.

The inorganic fillers used in the present invention include talc, clay, calcium carbonate, bentonite, silica, diatomaceous earth, metal oxides such as titanium oxide, sulfur powder, etc., and talc is especially preferred because of its excellent effect in inhibiting the early release of the fertilizer. Particle size of the inorganic fillers is preferably 50 $\mu$ or less, more preferably 20 $\mu$ or less in average particle size (according to laser diffraction method) for satisfactory inhibition of early release. Degradable film-coated granular fertilizers, which are capable of being controlled in release, are especially satisfactorily inhibited from early release since they contain the inorganic fillers. If the content of the inorganic fillers is lower than 5% by weight, the effect is insufficient, and if it is higher than 80% by weight, the film strength decreases and the control of release may also be deteriorated. The content of the inorganic fillers is preferably 10–70% by weight, more preferably 20–60% by weight based on the whole film.

The surface active agents used in the present invention include anionic surface active agents, nonionic surface active agents, cationic surface active agents, and amphoteric surface active agents, and especially preferred are nonionic surface active agents having a polymeric unit of alkylene oxide. Examples of the nonionic surface active agents in the present invention are polyoxyethylene alkyl esters, polyoxyethylene alkyl ethers, and polyoxyethylene alkyl phenol ethers, and, in addition, polyalkylene glycols such as polyethylene glycol, polypropylene glycol, and ethylene oxide-propylene oxide copolymer, and further include polyalkylene glycol derivatives such as polyethylene glycol, polypropylene glycol and ethylene oxide-propylene oxide copolymer in which at least one end of the main chain is methyl ether. The molecular weight of the polyalkylene glycol derivatives is not especially limited, and, for example, is in the range of 200–500,000. The HLB of the surface active agents is suitably 8–20. An HLB of 13–20 is preferred for an increase in the releasing rate with addition of the surface active agents in a small amount. By adding the surface active agents to the film, release of the fertilizer can be satisfactorily controlled and an optional releasing period can be set. If the content of the surface active agents is lower than 0.01% by weight, the effect is not sufficient, and if it is higher than 20% by weight, hydrophilicity of the film becomes too high and there is the possibility of deterioration in the release controllability. The content of the surface active agents is more preferably 0.01–10% by weight, further preferably 0.1–5% by weight based on the whole film.

In the present invention, a film is necessary which contains 10% by weight or more of a polyolefin and/or petroleum wax having a weight-average molecular weight of 300–10,000 and an inorganic filler and/or a surface active agent; preferred are a film containing 10–95% by weight of a polyolefin and/or petroleum wax having a weight-average molecular weight of 300–10,000 and 5–80% by weight of an inorganic filler and a film containing 10–99.99% by weight of a polyolefin and/or petroleum wax having a weight-average molecular weight of 300–10,000 and 0.01–20% by weight of a surface active agent; and more preferred is a film containing 10–94.99% by weight of a polyolefin and/or petroleum wax having a weight-average molecular weight of 300–10,000, 5–80% by weight of an inorganic filler and 0.01–20% by weight of a surface active agent. By using the combination of the polyolefin and/or petroleum wax having a weight-average molecular weight of 300–10,000 with the inorganic filler and the surface active agent, there can be obtained degradable film-coated granular fertilizers which have film degradability of a proper rate, are satisfactorily inhibited from early release and have release controllability over a long period of time.

The ethylene-vinyl acetate copolymers in the present invention are copolymers comprising ethylene and vinyl acetate, and the content and molecular weight of the vinyl acetate are not particularly limited. The content of vinyl acetate is preferably 5% by weight or higher for obtaining sufficient mechanical strength and 50% by weight or lower for inhibition of adhesion at the time of coating. Weight-average molecular weight is 50,000 or more, preferably 110,000 or more, more preferably 180,000 or more from the points of inhibition of adhesion at the time of coating and mechanical strength of the film, and is preferably 250,000 or less from the point of giving good degradability. Melt flow rate (JIS K6730) of the ethylene-vinyl acetate copolymer is 1 dg/min or more from the point of giving good degradability. The melt flow rate is 500 dg/min or less, preferably 30 dg/min or less, more preferably 3.5 dg/min or less from the points of inhibition of adhesion at the time of coating and mechanical strength of the film. Furthermore, there may be used hydrolyzates of the ethylene-vinyl acetate copolymers, the ethylene-vinyl acetate copolymers modified with unsaturated carboxylic acids, the ethylene-vinyl acetate copolymers modified by graft polymerization with vinyl chloride, etc., and the ethylene-vinyl acetate copolymers partially copolymerized with other monomers. The method for the production thereof is not limited, and an ordinary high-pressure radical polymerization method, a solution polymerization method, an emulsion polymerization method, etc. can be employed.

The ethylene-α-olefin copolymers in the present invention are copolymers of ethylene and α-olefin which have a weight-average molecular weight of 20,000 or more measured by gel permeation chromatography (GPC), a ratio (Mw/Mn) of weight-average molecular weight (Mw) and number-average molecular weight (Mn) of 1–3, and a density of 0.8–0.9 g/cm$^3$ measured by the method of ASTM-D792. Preferred are random copolymers of ethylene and at least one of α-olefins having 6–12 carbon atoms. Examples of the α-olefins having 6–12 carbon atoms are hexene-1, 4-methyl-pentene-1, heptene-1, octene-1, nonene-1, decene-1, undecene-1, and dodecene-1. The ethylene-α-olefin copolymers used in the present invention are preferably produced using known metallocene catalysts. The metallocene catalysts comprise a cyclopentadienyl derivative of a metal of Group IV, such as titanium or zirconium and a co-catalyst, and they are characterized in that not only are they highly active as polymerization catalysts, but also the molecular weight distribution of the resulting polymers is narrower than that of polymers obtained using conventional catalysts such as Ziegler catalysts, and the distribution of α-olefins of 6–12 carbon atoms which are comonomers in the copolymers is uniform. An Mw/Mn of 1–3 and a density of 0.8–0.9 g/cm$^3$ of the ethylene-α-olefin copolymers are preferred from the points of improvement of mechanical strength of the film and inhibition of early release. The weight-average molecular weight of the ethylene-α-olefin copolymers is 30,000 or more, preferably 70,000 or more, more preferably 130,000 or more from the points of inhibition of adhesion at the time of coating and mechanical strength of the film, and is preferably 250,000 or less for giving good degradability. The melt flow rate (ASTM D-1238) of the ethylene-α-olefin copolymers is 0.1 dg/min or more from the point of giving good degradability, and is preferably 30 dg/min or less, more preferably 5 dg/min or less, further preferably 0.5 dg/min or less from the points of inhibition of adhesion at the time of coating and mechanical strength of the film.

By providing a film containing the ethylene-vinyl acetate copolymer and/or the ethylene-α-olefin copolymer according to the present invention, the mechanical strength of the film can be greatly improved and early release can be further effectively inhibited. The content of the ethylene-vinyl acetate copolymer and/or the ethylene-α-olefin copolymer is preferably 1–60% by weight based on the whole film. If the content is lower than 1% by weight, the effect is insufficient, and if it is higher than 60% by weight, degradability of the film is deteriorated. The content is preferably 1–47.5% by weight, more preferably 5–40% by weight, further preferably 5–20% by weight. The weight ratio of the ethylene-vinyl acetate copolymer and/or the ethylene-α-olefin copolymer and the polyolefin and/or petroleum wax having a weight-average molecular weight of 300–10,000 is preferably 0.01–2.0 for giving all of the properties of satisfactory mechanical strength, inhibition of early release and degradability of the film. If the weight ratio is less than 0.01, the effect is insufficient, and if it is more than 2.0, degradability of the film is deteriorated. The weight ratio is more preferably 0.02–2.0, further preferably 0.05–1.0, and most preferably 0.1–0.7.

In the present invention, it is preferred to provide a film containing 10% by weight or more of a polyolefin and/or petroleum wax having a weight-average molecular weight of 300–10,000, an ethylene-vinyl acetate copolymer and/or an ethylene-α-olefin copolymer, and an inorganic filler and/or a surface active agent. It is more preferred to provide a film containing 10–94% by weight of a polyolefin and/or petroleum wax having a weight-average molecular weight of 300–10,000, 1–60% by weight of an ethylene-vinyl acetate copolymer and/or an ethylene-α-olefin copolymer, and 5–80% by weight of an inorganic filler. It is further preferred to provide a film containing 10–98.99% by weight of a polyolefin and/or petroleum wax having a weight-average molecular weight of 300–10,000, 1–60% by weight of an ethylene-vinyl acetate copolymer and/or an ethylene-α-olefin copolymer, and 0.01–20% by weight of a surface active agent. It is still more preferred to provide a film containing 10–93.99% by weight of a polyolefin and/or petroleum wax having a weight-average molecular weight of 300–10,000, 1–60% by weight of an ethylene-vinyl acetate copolymer and/or an ethylene-α-olefin copolymer, 5–80% by weight of an inorganic filler, and 0.01–20% by weight of a surface active agent. A degradable film-coated granular fertilizer having a higher mechanical strength, a film degradability of a proper rate, a satisfactory inhibition of early release, and a release controllability over a long period can be obtained by using a polyolefin and/or petroleum wax having a weight-average molecular weight of 300–10,000 and an ethylene-vinyl acetate copolymer and/or an ethylene-α-olefin copolymer in combination with an inorganic filler and a surface active agent.

In the above-mentioned film containing the inorganic filler, the surface active agent, or both of them, the content of the polyolefin and/or petroleum wax having a weight-average molecular weight of 300–10,000 is more preferably 20–90% by weight and still further preferably 30–80% by weight. The content of the ethylene-vinyl acetate copolymer and/or an ethylene-α-olefin copolymer based on the whole film is preferably 1–47.5% by eight, more preferably 5–40% by weight, and still further preferably 5–20% by weight. Moreover, the weight ratio of the ethylene-vinyl acetate copolymer and/or ethylene-α-olefin copolymer and the polyolefin and/or petroleum wax having a weight-average molecular weight of 300–10,000 is preferably 0.01–2.0. From the viewpoint of degradability of the film, the total weight of the polyolefin and/or petroleum wax having a weight-average molecular weight of 300–10,000 and the ethylene-vinyl acetate copolymer and/or ethylene-α-olefin copolymer is preferably 40% by weight or more, more preferably 70% by weight or more based on the weight of the film excluding the inorganic filler.

In the present invention, at least one biodegradable material selected from the group consisting of starch, modified starch, cereal powder, cellulose, agar, and xanthone can be contained in the film. The degradation rate of the film can be changed by adding these biodegradable materials to the film. The content of the biodegradable materials based on the whole film is preferably 0.5–20% by weight. If the content is lower than 0.5% by weight, the effect of the addition is insufficient, and if it is higher than 20% by weight, this is not preferred from the point of mechanical strength of the film.

In the present invention, a synergistic effect of degradation by microorganisms and photodegradation and/or oxidative degradation is obtained by containing a photodegradation accelerator and/or an oxidative degradation accelerator in the film, and this is further preferred.

As the photodegradation accelerators, organometallic complexes are preferred. Examples thereof are organometallic complexes containing at least one metal selected from the group consisting of iron, cobalt, nickel, copper, manganese, silver, palladium, molybdenum, chromium, tungsten, and cerium. Preferred complexing agents are, for example, β-diketones such as acetyl acetone, β-ketoesters, dialkyl dithiocarbamates, dialkyl dithiophosphates, alkyl xanthates, and mercaptobenzothiazole. More specifically, nickel dibutyldithiocarbamate, nickel diethyldithiocarbamate, and acetyl acetone complexes of iron can be preferably used. The content of the organometallic complexes based on the weight of the film is $0.02$–$20\times10^{-6}$ mole/g, preferably $0.1$–$10\times10^{-6}$ mole/g. If the content is less than $0.02\times10^{-6}$ mole/g, the effect of the addition is insufficient, and more than $20\times10^{-6}$ mole/g is not preferred from the economical point.

As the oxidative degradation accelerators, preferred are compounds having a —C═C— unsaturated bond, transition metals or transition metal compounds. As the compounds having a —C═C— unsaturated bond, mention may be made of unsaturated fatty acids such as oleic acid, linolic acid, linolenic acid, arachidonic acid, erucic acid, palmitolic acid, ricinolic acid, and eleostearic acid, unsaturated fatty acid esters such as methyl esters, ethyl esters, propyl esters, and isobutyl esters of oleic acid, linolic acid, linolenic acid, arachidonic acid, erucic acid, palmitolic acid, ricinolic acid, and eleostearic acid, fats and oils, e.g., vegetable oils such as linseed oil, soybean oil and tung oil which are drying oils, rapeseed oil and cotton seed oil which are semidrying oils, olive oil, tsubaki oil, and castor oil which are nondrying oils, and animal oils such as whale oil, beef tallow, fish oil, and liver oil, polybutadiene, polyisobutene, styrene-butadiene copolymer, styrene-isoprene copolymer, and acrylonitrile-butadiene copolymer, and others. As the transition metals and the transition metal compounds, mention may be made of fine powders of copper, silver, zinc, cadmium, chromium, molybdenum, iron, cobalt, nickel, etc., and oxides, halides, inorganic metal salts, and organometallic salts of these metals.

In the present invention, the film can contain other resins, colorants, lubricants and other additives. Examples of the resins are polyethylene, polypropylene, polystyrene, polymethyl (meth)acrylate (the letters in the parentheses may or may not be read hereinafter), ethylene-(meth)acrylic acid copolymer, ethylene-(meth)acrylate copolymer, ethylene-carbon monoxide copolymer, polyvinyl chloride, polyvinylidene chloride, vinyl chloride-vinylidene chloride copolymer, and diene (co)polymers such as polybutadiene, polyisoprene, polychloroprene, butadiene-styrene copolymer, EPDM, and styrene-isoprene copolymer. In addition, there may be used natural resins such as petroleum resin, natural rubber, and rosin, fats and oils such as hardened oil and solid fatty acid, and modified products thereof, and waxes such as bees wax and Japan wax. As the colorants, there may be used conventional pigments and dyes such as carbon black and titanium white. Furthermore, an anticoagulant such as silica flour may be adhered to the surface of the film for the prevention of coagulation.

The granular fertilizers to be coated are not limited, and conventionally known fertilizers can be used. Preferred examples are nitrogen-containing organic compounds such as urea, aldehyde-condensation urea, isobutyl aldehyde-condensation urea, formaldehyde-condensation urea, guanylurea sulfate, and oxamide, ammonium and nitric acid compounds such as ammonium nitrate, ammonium dihydrogenphosphate, diammonium hydrogen-phosphate, ammonium sulfate, ammonium chloride, and sodium nitrate, potassium salts such as potassium nitrate, potassium phosphate, potassium sulfate, and potassium chloride, calcium salts such as calcium phosphate, calcium sulfate, calcium nitrate, and calcium chloride, magnesium salts such as magnesium nitrate, magnesium chloride, magnesium phosphate, and magnesium sulfate, iron salts such as ferrous nitrate, ferric nitrate, ferrous phosphate, ferric phosphate, ferrous sulfate, ferric sulfate, ferrous chloride, and ferric chloride, and double salts thereof, or mixtures of two or more of them.

These granular fertilizers sometimes contain known binders for maintaining the granular shape and the mechanical strength. Examples of the binders are black-strap molasses, lignin sulfonates, and modified products thereof. The weight proportion of the film to the granular fertilizer before being coated with the film is preferably 1–50% by weight, more preferably 3–20% by weight, and still further preferably 3–15% by weight. If the weight proportion is lower than 1% by weight, it becomes difficult to control the release of components as fertilizers, and if it is higher than 50% by weight, the quality as fertilizers deteriorates. Particle size of the granular fertilizers before being coated is not limited, but is usually 0.5–10 mm, preferably 1–5 mm. The shape is preferably close to sphere.

As a method for producing the coated granular fertilizer coated with a degradable film of the present invention, a suitable method is a method which includes a step of supplying a dispersion, solution or melt containing the film constituting components in the form of spray to a granular fertilizer in a fluid or tumbled state to form a film on the surface of the granular fertilizer. In the present invention, the method using a dispersion or a solution is preferred to the method using a melt because early release can be satisfactorily inhibited.

The granular fertilizer can be made into the fluid state, for example, by introducing the granular fertilizer into a jetting apparatus to produce a jet, and can be made into the tumbled state, for example, by using a drum-shaped or pan-shaped apparatus such as a sugar-coating machine. Conventionally known jetting apparatuses can be used. These apparatuses are disclosed, for example, in JP-B-54-3104. That is, they comprise a body of a jetting column provided with a blower for blowing a gas, a liquid supply pump for supplying a dispersion, a solution or a melt, a spray nozzle, a thermometer, etc. A granular fertilizer to be coated is introduced into the jetting column, and a gas of a given temperature is blown from the blower, etc. with adjusting the gas flow rate so as to produce a stable jet of the fertilizer in the column. When the temperature in the column reaches the desired temperature, the specific dispersion, solution or melt is supplied in the form of spray from the spray nozzle to form a film on the surface of the granular fertilizer. The conditions such as temperature and gas flow rate in this case can be optionally changed depending on the composition, etc. In the case of the tumbling apparatus, similarly, the granular fertilizer to be coated is introduced into the apparatus, and a gas of a given temperature is blown from the blower, etc. with adjusting the rotating rate so as to cause a stable tumbling of the fertilizer. When the inside of the apparatus reaches the desired temperature, the specific dispersion, solution or melt is supplied in the form of a spray from the spray nozzle to form a film on the surface of the granular fertilizer. The conditions such as temperature and gas flow rate in this case can be optionally changed depending on the composition, etc.

The dispersion, solution or melt contains a polyolefin and/or petroleum wax having a weight-average molecular weight of 300–10,000, an ethylene-vinyl acetate copolymer and/or an ethylene-α-olefin copolymer, an inorganic filler, a surface active agent, and other components in given amounts, respectively, and is composed of only these components or these components and a solvent.

In the case of comprising only the components, it can be sprayed in the form of the melt without a solvent.

In the case of using a solvent, the components can be sprayed in the form of the solution or dispersion. The solvents used in the present invention are not limited. Preferred examples are aromatic solvents such as benzene, toluene, xylene, and mesitylene, aliphatic hydrocarbons such as hexane, heptane, n-octane, 2-ethylhexane, and 2-ethylcyclohexane, and chlorinated hydrocarbons such as dichloromethane, trichloromethane, tetrachloromethane, trichloroethylene, and tetrachloroethylene. The materials mixed with these solvents may be or may not be soluble in the solvents. From this point of view, the mixture is called a dispersion or a solution in this specification. The polyolefin and/or petroleum wax having a weight-average molecular weight of 300–10,000, the ethylene-vinyl acetate copolymer and/or the ethylene-α-olefin copolymer, the surface active agent, and other resins are preferably dissolved in the solvent, but in many cases, the inorganic filler is used as a dispersion without being dissolved.

"Solid matter" means the portion other than the solvent in the total dispersion or solution, and "solid concentration" means a proportion of the weight of the portion other than the solvent to the weight of the total mixture containing the solvent, which is expressed by percentage. The solid concentration is measured by drying the dispersion or solution at 130° C. for 24 hours and measuring the weight before and after the drying. The solid concentration in the case of using a solvent in the present invention is preferably 1–20% by weight, more preferably 3–15% by weight.

The film forming temperature is not limited, but is usually set at 30° C. or higher, and at such a temperature there is no adhesion between particles. Specifically, a range of about 30–150° C. is preferred, and a range of 30–100° C. is more preferred. The hot air in the jetting apparatus should be set at a temperature and a flow rate which are necessary for stably jetting the fertilizer particles and maintaining the above-mentioned temperature. These techniques can be performed by applying conventionally known techniques.

The present invention will be explained in more detail by the following examples and comparative examples. The tests in the examples and comparative examples were conducted by the following methods.

Measurement of molecular weight:

Using a high-temperature GPC device (PL-GPC 210 manufactured by Polymer Laboratory Co., Ltd.) equipped with two columns (PL gel MIXED-B manufactured by Polymer Laboratory Co., Ltd.), analysis was conducted at an oven temperature of 140° C. with ortho-dichlorobenzene as an eluent. Calibration of the molecular weight was carried out using a standard polyethylene sample of Polymer Laboratory Co., Ltd.

Releasing test:

Farmland soil was air dried and sifted by a 10 mesh sieve. 250 Grams of the minus sieve was mixed with 2 g of a coated granular fertilizer, and the mixture was put in a polyethylene bottle. Water was added thereto so that water content reached 60% of the maximum water content, followed by leaving it at 25° C. After a lapse of a given period of time, the soil containing the sample was sifted by a 10 mesh sieve, and the coated granular fertilizer remaining on the sieve was collected and ground in a mortar and dissolved with addition of water, followed by filtration. Concentrations of nitrogen, phosphoric acid, potassium, etc. in the fertilizer components in the filtrate were measured by a Zenno type soil analyzer Model ZA-II. The amount of urea was measured by ultraviolet absorption spectrophotometry. The releasing rate was indicated by the percentage of the released components for the fertilizer components contained in the original coated granular fertilizer. The table shows the number of days required for releasing 80% of the fertilizer components, and the releasing rate after 3 days (early releasing rate).

Degradation test:

One kilogram farmland soil was mixed with 60 g of the coated fertilizer. Then, the soil was put in a bottomless frame and left to stand outside. After a lapse of 3 years, the proportion of the coated fertilizer which did not at all maintain the shape of the original film in respect to the whole fertilizer was employed as the degradation rate. The mixture was subjected to mixing at a frequency of 1 time/month.

Abrasion resistance test:

Fifteen grams of the coated fertilizer, 250 g of silica sand NIKKO No.4 (manufactured by Kawatetsu Kogyo Co., Ltd.), and three porcelain balls (25 mmφ) were put in a ball mill, and the ball mill was revolved for 3 hours (78 rpm). The coated fertilizer, before and after being subjected to this test, was subjected to the releasing test, and the difference in the releasing rate on the third day was obtained. The smaller value indicates a higher abrasion resistance.

Shock resistance test:

Twenty kilograms of the coated fertilizer was put in a polyethylene bag, and this bag was dropped from the height of 2 m ten times. Then, the coated fertilizer in the bottom portion of the bag was collected. The coated fertilizer, before and after being subjected to this test, was subjected to the releasing test, and the shock resistance was expressed by the difference in the releasing rate on the third day. The smaller value indicates higher shock resistance.

EXAMPLE 1

Figure 1:
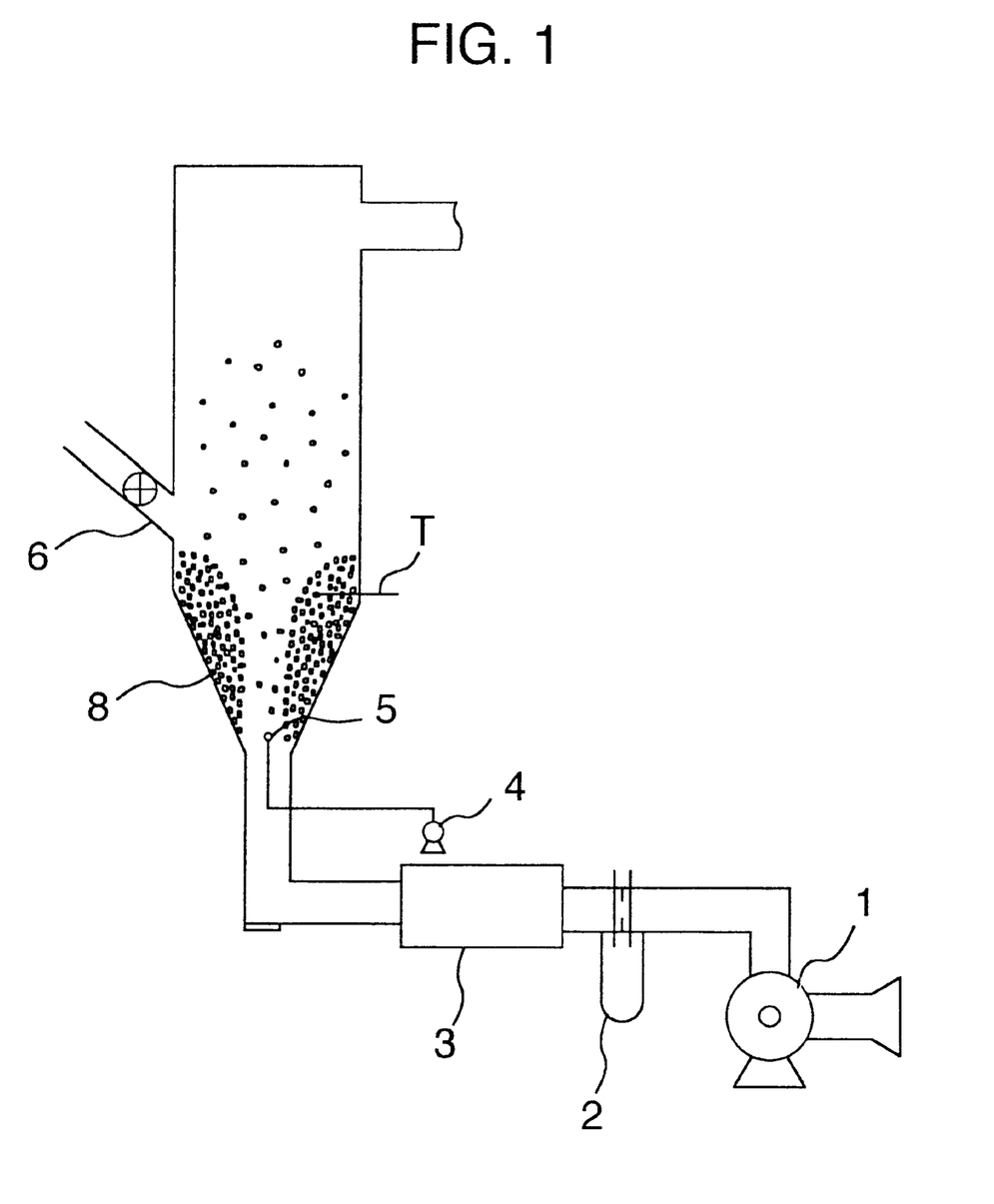
FIG. 1 is a schematic view of one example of jetting apparatuses used for the production method of the present invention.

A coated fertilizer was prepared using the jetting apparatus shown in FIG. 1. That is, 90 parts by weight of tetrachloroethylene was added to 5 parts by weight of polyethylene having a weight-average molecular weight of 630 and a number-average molecular weight of 580, and 5 parts by weight of talc, and the mixture was refluxed under heating to the boiling point of the solvent to dissolve the components. 100 parts by weight of granular potash nitrophosphate (the components N, $P_2O_5$ and $K_2O$ were 15% each) of 3.0 mm in average particle size which was sifted to a range of 2–4 mm (fertilizer 8 in FIG. 1) was introduced into the jetting apparatus from the fertilizer inlet 6, and the jetting state was allowed to occur by blowing hot air by blower 1, orifice 2 and heater 3 so that the temperature T in the apparatus was stabilized at 60° C. Then, the above dispersion was supplied to the jetting apparatus from a spray nozzle 5 by liquid supply pump 4 over a period of 8 minutes, during which the temperature of the hot air was adjusted so that the temperature T in the jetting apparatus was within the range of 60±2° C. After completion of the supply of the solution, the hot air was replaced with cold air, and the content was taken out from the jetting apparatus when the temperature reached 350° C. or lower.

The resulting coated fertilizer was in an amount of 110 parts by weight, and it was found that nearly the whole quantity of the supplied solid matter was coated.

Furthermore, the coated particles were crushed in a mortar and dissolved with the addition of water, followed by filtration. The film, after filtration and drying, was dissolved in ortho-dichlorobenzene, and the molecular weight of the film was measured by the above-mentioned method. As a result, it was confirmed that the weight-average molecular weight was the same as that of the charged polyethylene.

Moreover, the coated granular fertilizer was subjected to the releasing test and the degradation test. The results are shown in Table 1.

EXAMPLE 2

A coated fertilizer was obtained in the same manner as in Example 1, except for using a dispersion of 9 parts by weight of polyethylene having a weight-average molecular weight of 1400 and a number-average molecular weight of 760 and 1 part by weight of talc in tetrachloroethylene. Furthermore, the measurement of the molecular weight, the releasing test, and the degradation test were conducted in the same manner as above. The results are shown in Table 1.

EXAMPLE 3

A coated fertilizer was obtained in the same manner as in Example 1, except for using a solution of 9.999 parts by weight of polyethylene having a weight-average molecular weight of 630 and a number-average molecular weight of 580 and 0.001 part by weight of polyoxyethylene monostearate (HLB=8) in tetrachloroethylene. Furthermore, the measurement of the molecular weight, the releasing test, and the degradation test were conducted in the same manner as above. The results are shown in Table 1.

EXAMPLE 4

A coated fertilizer was obtained in the same manner as in Example 1, except for using a solution of 9 parts by weight of polyethylene having a weight-average molecular weight of 1400 and a number-average molecular weight of 760 and 1 part by weight of polyoxyethylene monostearate (HLB=8) in tetrachloroethylene. Furthermore, the measurement of the molecular weight, the releasing test, and the degradation test were conducted in the same manner as above. The results are shown in Table 1.

EXAMPLE 5

A coated fertilizer was obtained in the same manner as in Example 1, except for using a dispersion of 4.95 parts by weight of polyethylene having a weight-average molecular weight of 1400 and a number-average molecular weight of 760, 5 parts by weight of talc and 0.05 part by weight of polyoxyethylene monostearate (HLB=8) in tetrachloroethylene. Furthermore, the measurement of the molecular weight, the releasing test, and the degradation test were conducted in the same manner as above. The results are shown in Table 1.

EXAMPLE 6

A coated fertilizer was obtained in the same manner as in Example 1, except for using a dispersion of 5.9 parts by weight of polyethylene having a weight-average molecular weight of 630 and a number-average molecular weight of 580, 4 parts by weight of talc and 0.1 part by weight of polyoxyethylene nonylphenyl ether (HLB=13) in tetrachloroethylene. Furthermore, the measurement of the molecular weight, the releasing test, and the degradation test were conducted in the same manner as above. The results are shown in Table 1.

EXAMPLE 7

A coated fertilizer was obtained in the same manner as in Example 1, except for using a dispersion of 1.999 parts by weight of polyethylene having a weight-average molecular weight of 5100 and a number-average molecular weight of 1600, 8 parts by weight of talc and 0.001 part by weight of polyoxyethylene monostearate (HLB=8) in tetrachloroethylene. Furthermore, the measurement of the molecular weight, the releasing test, and the degradation test were conducted in the same manner as above. The results are shown in Table 1.

EXAMPLE 8

A coated fertilizer was obtained in the same manner as in Example 1, except for using a dispersion of 9.4 parts by weight of paraffin wax having a weight-average molecular weight of 530 and a number-average molecular weight of 330, 0.5 part by weight of talc and 0.1 part by weight of polyoxyethylene monostearate (HLB=8) in tetrachloroethylene. Furthermore, the measurement of the molecular weight, the releasing test, and the degradation test were conducted in the same manner as above. The results are shown in Table 1.

EXAMPLE 9

Figure 2:
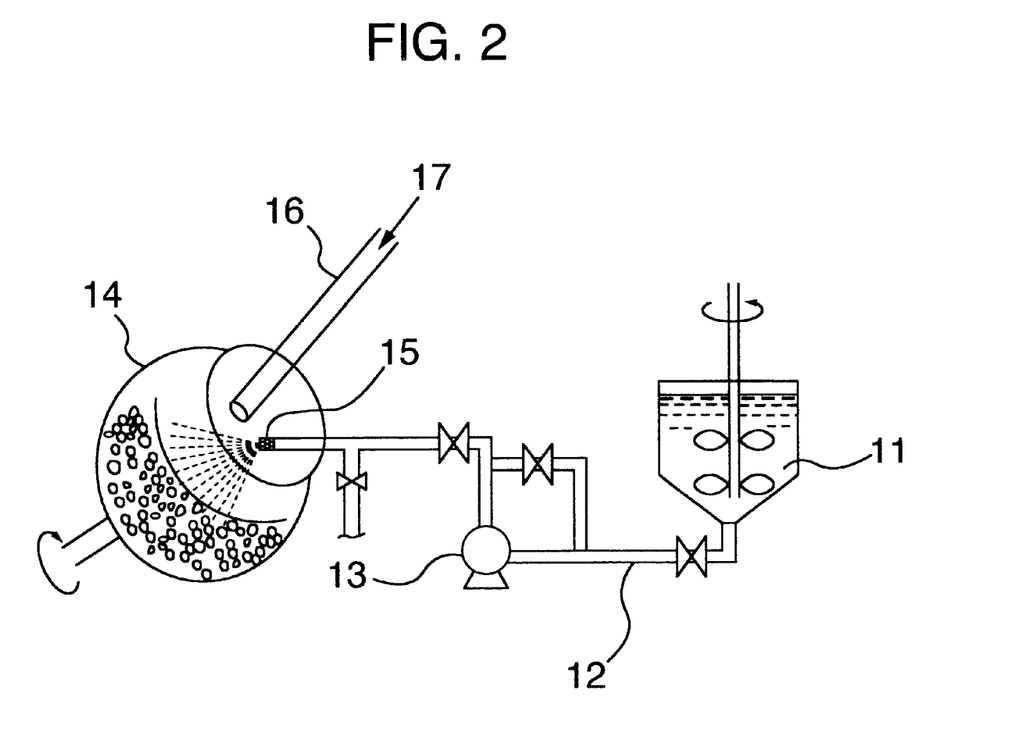
FIG. 2 is a schematic view of one example of tumbling coating apparatuses used for the production method of the present invention.

A coated fertilizer was prepared using the tumbling type coating apparatus shown in FIG. 2. That is, 90 parts by weight of tetrachloroethylene was added to 4.95 parts by weight of polyethylene having a weight-average molecular weight of 1400 and a number-average molecular weight of 760, 5 parts by weight of talc, and 0.05 part by weight of polyoxyethylene monostearate (HLB=8), and these were refluxed under heating to the boiling point of the solvent to dissolve the components. 100 parts by weight of granular potash nitrophosphate (the components N, $P_2O_5$ and $K_2O$ were 15% each) of 3.0 mm in average particle size which was sifted to a range of 2–4 mm was introduced into a rotating pan 14 of the tumbling type coating apparatus, and hot air 17 was blown in from a hot air inlet 16 under tumbling to raise the temperature in the apparatus to 60° C. Then, the above dispersion was charged in a tank 11 and supplied into the rotating pan 14 from a spray nozzle 15 through a liquid supply pipe 12 by a liquid supply pump 13 over a period of 10 minutes, during which the temperature of the hot air 17 was adjusted so that the temperature in the apparatus was within the range of 60±10° C. After completion of the supply of the solution, the hot air was replaced with cold air, and the content was taken out from the apparatus when the temperature reached 35° C. or lower.

The resulting coated fertilizer was in an amount of 110 parts by weight, and it was found that nearly the whole quantity of the supplied solid matter was coated. Furthermore, the coated particles were crushed in a mortar and dissolved with addition of water, followed by filtration. The film after filtration and drying was dissolved in ortho-dichlorobenzene, and the molecular weight of the film was measured by the above-mentioned method. As a result, it was confirmed that the weight-average molecular weight was the same as that of the charged polyethylene.

Moreover, the coated granular fertilizer was subjected to the releasing test and the degradation test as mentioned above. The results are shown in Table 1.

EXAMPLE 10

A coated fertilizer was prepared using the tumbling type coating apparatus shown in FIG. 2. That is, 5.9 parts by weight of polyethylene having a weight-average molecular weight of 630 and a number-average molecular weight of 580, 4 parts by weight of talc, and 0.1 part by weight of polyoxyethylene nonylphenyl ether (HLB=13) were heated at 120° C. to melt them. 100 parts by weight of granular potash nitrophosphate (the components N, $P_2O_5$ and $K_2O$ were 15% each) of 3.0 mm in average particle size which was sifted to a range of 2–4 mm was introduced into the tumbling type coating apparatus, and a hot air was blown thereinto from the hot air inlet 16 under tumbling to raise the temperature in the apparatus to 80° C. Then, the above melt was charged in the tank 11 and supplied into the rotating pan 14 from the spray nozzle 15 through the liquid supply pipe 12 by the liquid supply pump 13 over a period of 20 minutes, during which time the temperature of the hot air was adjusted so that the temperature in the apparatus was within the range of 80±10° C. After completion of the supply of the solution, the hot air was replaced with a cold air, and the content was taken out from the apparatus when the temperature reached 35° C. or lower.

The resulting coated fertilizer was in an amount of 110 parts by weight, and it was found that nearly the whole of the supplied solid matter was coated. Furthermore, the coated particles were crushed in a mortar and dissolved with addition of water, followed by filtration. The film, after filtration and drying, was dissolved in ortho-dichlorobenzene, and the molecular weight of the film was measured by the above-mentioned method. As a result, it was confirmed that the weight-average molecular weight was the same as that of the charged polyethylene.

Moreover, the coated granular fertilizer was subjected to the releasing test and the degradation test as mentioned above. The results are shown in Table 1.

COMPARATIVE EXAMPLE 1

A coated fertilizer was obtained in the same manner as in Example 1, except for using a dispersion of 4 parts by weight of a low-density polyethylene having a weight-average molecular weight of 95000 and a number-average molecular weight of 9500 and 6 parts by weight of talc in tetrachloroethylene. Furthermore, the measurement of the molecular weight, the releasing test, and the degradation test were conducted in the same manner as above. The results are shown in Table 1.

COMPARATIVE EXAMPLE 2

A coated fertilizer was obtained in the same manner as in Example 1, except for using a dispersion of 5 parts by weight of polycaprolactone having a weight-average molecular weight of 10000 and 5 parts by weight of talc in tetrachloroethylene. Furthermore, the measurement of the molecular weight, the releasing test, and the degradation test were conducted in the same manner as above. The results are shown in Table 1.

COMPARATIVE EXAMPLE 3

A coated fertilizer was obtained in the same manner as in Example 1, except for using a solution of 10 parts by weight of polyethylene having a weight-average molecular weight of 630 and a number-average molecular weight of 580 in tetrachloroethylene. Furthermore, the measurement of the molecular weight, the releasing test, and the degradation test were conducted in the same manner as above. The results are shown in Table 1.

EXAMPLE 11

A coated fertilizer was prepared using the jetting apparatus shown in FIG. 1. That is, 90 parts by weight of tetrachloroethylene was added to 3.95 parts by weight of polyethylene having a weight-average molecular weight of 910 and a number-average molecular weight of 520, 1 part by weight of ethylene-vinyl acetate copolymer (content of vinyl acetate: 25% by weight; melt flow rate: 2 dg/min; weight-average molecular weight: 210,000), 5 parts by weight of talc (average particle size: 10 $\mu$), and 0.05 part by weight of polyoxyethylene monostearate (HLB=8), and these were refluxed under heating to the boiling point of the solvent to dissolve the components. 100 parts by weight of granular potash nitrophosphate (the components N, $P_2O_5$ and $K_2O$ were 15% each) of 3.0 mm in average particle size which was sifted to the range of 2–4 mm (fertilizer 8 in FIG. 1) was introduced into the jetting apparatus from the fertilizer inlet 6, and a jetting state was allowed to occur by blowing hot air by blower 1, orifice 2 and heater 3 so that the temperature T in the apparatus was stabilized at 60° C. Then, the above solution was supplied to the jetting apparatus from the spray nozzle 5 by the liquid supply pump 4 over a period of 8 minutes, during which time the temperature of the hot air was adjusted so that the temperature T in the jetting apparatus was within the range of 60±2° C. After completion of the supply of the solution, the hot air was replaced with cold air, and the content was taken out from the jetting apparatus when the temperature reached 35° C. or lower.

The resulting coated fertilizer was in an amount of 110 parts by weight, and it was found that nearly the whole of the supplied solid matter was coated. Furthermore, the coated particles were crushed in a mortar and dissolved with the addition of water, followed by filtration. The film after filtration and drying was dissolved in ortho-dichlorobenzene, and the molecular weight of the film was measured by the above-mentioned method. As a result, it was confirmed that the weight-average molecular weight was the same as that of the charged polyethylene.

Moreover, the coated granular fertilizer was subjected to the releasing test, the degradation test, the abrasion resistance test, and the shock resistance test in the same manner as above. The results are shown in Table 2.

EXAMPLE 12

A coated fertilizer was obtained in the same manner as in Example 11, except for using a dispersion of 4.8 parts by weight of polyethylene having a weight-average molecular weight of 910 and a number-average molecular weight of 520, 0.1 part by weight of ethylene-vinyl acetate copolymer (content of vinyl acetate: 46% by weight; melt. flow rate: 95 dg/min; weight-average molecular weight: 81,000), 5 parts by weight of talc (average particle size: 10 $\mu$), and 0.1 part by weight of polyoxyethylene monostearate (HLB=8) in tetrachloroethylene. Moreover, the measurement of the molecular weight, the releasing test, the degradation test, the abrasion resistance test, and the shock resistance test were conducted in the same manner as above. The results are shown in Table 2.

EXAMPLE 13

A coated fertilizer was obtained in the same manner as in Example 11, except for using a dispersion of 2.99 parts by weight of polyethylene having a weight-average molecular weight of 910 and a number-average molecular weight of 520, 2 parts by weight of ethylene-vinyl acetate copolymer (content of vinyl acetate: 25% by weight; melt flow rate: 2 dg/min; weight-average molecular weight: 210,000), 5 parts by weight of talc (average particle size: 10 $\mu$), and 0.01 part by weight of polyoxyethylene monostearate (HLB=8) in tetrachloroethylene. Moreover, the measurement of the molecular weight, the releasing test, the degradation test, the abrasion resistance test, and the shock resistance test were conducted in the same manner as above. The results are shown in Table 2.

EXAMPLE 14

A coated fertilizer was obtained in the same manner as in Example 11, except for using a dispersion of 2.45 parts by weight of polyethylene having a weight-average molecular weight of 910 and a number-average molecular weight of 520, 2.5 parts by weight of ethylene-vinyl acetate copolymer (content of vinyl acetate: 14% by weight; melt flow rate: 3.5 dg/min; weight-average molecular weight: 180,000), 5 parts by weight of talc (average particle size: 10 µ), and 0.05 part by weight of polyoxyethylene monostearate (HLB=8) in tetrachloroethylene. Moreover, the measurement of the molecular weight, the releasing test, the degradation test, the abrasion resistance test, and the shock resistance test were conducted in the same manner as above. The results are shown in Table 2.

EXAMPLE 15

A coated fertilizer was obtained in the same manner as in Example 11, except for using a dispersion of 4.45 parts by weight of polyethylene having a weight-average molecular weight of 910 and a number-average molecular weight of 520, 0.5 part by weight of ethylene-vinyl acetate copolymer (content of vinyl acetate: 33% by weight; melt flow rate: 30 dg/min; weight-average molecular weight: 110,000), 5 parts by weight of talc (average particle size: 10 µ), and 0.05 part by weight of polyoxyethylene monostearate (HLB=8) in tetrachloroethylene, and using granular urea in place of the granular potash nitrophosphate. Moreover, the measurement of the molecular weight, the releasing test, the degradation test, the abrasion resistance test, and the shock resistance test were conducted in the same manner as above. The results are shown in Table 2.

EXAMPLE 16

A coated fertilizer was obtained in the same manner as in Example 11, except for using a dispersion of 8.05 parts by weight of polyethylene having a weight-average molecular weight of 910 and a number-average molecular weight of 520, 0.9 part by weight of ethylene-vinyl acetate copolymer (content of vinyl acetate: 28% by weight; melt flow rate: 400 dg/min; weight-average molecular weight: 57,000), 1 part by weight of talc (average particle size: 10 µ), and 0.05 part by weight of polyoxyethylene monostearate (HLB=8) in tetrachloroethylene. Moreover, the measurement of the molecular weight, the releasing test, the degradation test, the abrasion resistance test, and the shock resistance test were conducted in the same manner as above. The results are shown in Table 2.

EXAMPLE 17

A coated fertilizer was obtained in the same manner as in Example 11, except for using a dispersion of 1.3 parts by weight of polyethylene having a weight-average molecular weight of 910 and a number-average molecular weight of 520, 1.5 part by weight of ethylene-vinyl acetate copolymer (content of vinyl acetate: 25% by weight; melt flow rate: 2 dg/min; weight-average molecular weight: 210,000), 7 parts by weight of talc (average particle size: 10 µ), and 0.2 part by weight of polyoxyethylene monostearate (HLB=8) in tetrachloroethylene. Moreover, the measurement of the molecular weight, the releasing test, the degradation test, the abrasion resistance test, and the shock resistance test were conducted in the same manner as above. The results are shown in Table 2.

EXAMPLE 18

A coated fertilizer was obtained in the same manner as in Example 11, except for using a dispersion of 4.75 parts by weight of polyethylene having a weight-average molecular weight of 5100 and a number-average molecular weight of 1600, 0.2 part by weight of ethylenevinyl acetate copolymer (content of vinyl acetate: 25% by weight; melt flow rate: 2 dg/min; weight-average molecular weight: 210,000), 5 parts by weight of talc (average particle size: 10 µ), and 0.05 part by weight of polyoxyethylene monostearate (HLB=8) in tetrachloroethylene. Moreover, the measurement of the molecular weight, the releasing test, the degradation test, the abrasion resistance test, and the shock resistance test were conducted in the same manner as above. The results are shown in Table 2.

EXAMPLE 19

A coated fertilizer was obtained in the same manner as in Example 11, except for using a dispersion of 2.95 parts by weight of paraffin wax having a weight-average molecular weight of 530 and a number-average molecular weight of 330 (melting point: 70° C.), 2 parts by weight of ethylene-vinyl acetate copolymer (content of vinyl acetate: 25% by weight; melt flow rate: 2 dg/min; weight-average molecular weight: 210,000), 5 parts by weight of talc (average particle size: 10 µ), and 0.05 part by weight of polyoxyethylene monostearate (HLB=8) in tetrachloroethylene. Moreover, the measurement of the molecular weight, the releasing test, the degradation test, the abrasion resistance test, and the shock resistance test were conducted in the same manner as above. The results are shown in Table 2.

EXAMPLE 20

A coated fertilizer was obtained in the same manner as in Example 11, except for using a dispersion of 3.95 parts by weight of polyethylene having a weight-average molecular weight of 910 and a number-average molecular weight of 520, 1 part by weight of ethylene-vinyl acetate copolymer (content of vinyl acetate: 25% by weight; melt flow rate: 2 dg/min; weight-average molecular weight: 210,000), 5 parts by weight of talc (average particle size: 10 µ), 0.05 part by weight of polyoxyethylene monostearate (HLB=8), 0.00177 part by weight of iron acetylacetone complex, and 0.00071 part by weight of nickel dibutyldithiocarbamate in tetrachloroethylene. Moreover, the measurement of the molecular weight, the releasing test, the degradation test, the abrasion resistance test, and the shock resistance test were conducted in the same manner as above. The results are shown in Table 2.

EXAMPLE 21

A coated fertilizer was obtained in the same manner as in Example 11, except for using a dispersion of 3.95 parts by weight of polyethylene having a weight-average molecular weight of 910 and a number-average molecular weight of 520, 1 part by weight of ethylene-vinyl acetate copolymer (content of vinyl acetate: 25% by weight; melt flow rate: 2 dg/min; weight-average molecular weight: 210,000), 5 parts by weight of talc (average particle size: 10 µ), 0.05 part by weight of polyoxyethylene monostearate (HLB=8), 0.00177 part by weight of iron acetylacetone complex, and 0.00071 part by weight of nickel dibutyldithiocarbamate in tetrachloroethylene, and using granular urea in place of the granular potash nitrophosphate. Moreover, the measurement of the molecular weight, the releasing test, the degradation test, the abrasion resistance test, and the shock resistance test were conducted in the same manner as above. The results are shown in Table 2.

EXAMPLE 22

A coated fertilizer was prepared using the tumbling type coating apparatus shown in FIG. 2. That is, 7.3 parts by weight of polyethylene having a weight-average molecular weight of 630 and a number-average molecular weight of 580, 0.2 part by weight of ethylene-vinyl acetate copolymer (content of vinyl acetate: 25% by weight; melt flow rate: 2 dg/min; weight-average molecular weight: 210,000), 2 parts by weight of talc (average particle size: 10 $\mu$), and 0.5 part by weight of polyoxyethylene nonylphenyl ether (HLB=13) were heated at 120° C. to melt them. 100 parts by weight of granular potash nitrophosphate (the components N, $P_2O_5$ and $K_2O$ were 15% each) of 3.0 mm in average particle size which was sifted to a range of 2–4 mm was introduced into the rotating pan 14 of the tumbling type coating apparatus, and a hot air 17 was blown thereinto from the hot air blowing inlet 16 under tumbling to raise the temperature in the apparatus to 80° C. Then, the above melt was charged in the tank 11 and supplied into the rotating pan 14 from the spray nozzle 15 through the liquid supply pipe 12 by the liquid supply pump 13 over a period of 20 minutes, during which time the temperature of the hot air 17 was adjusted so that the temperature in the apparatus was within the range of 80±10° C. After completion of the supply of the solution, the hot air was replaced by cold air, and the content was taken out from the apparatus when the temperature reached 35° C. or lower.

The resulting coated fertilizer was in an amount of 110 parts by weight, and it was found that nearly the whole quantity of the supplied solid matter was coated. Furthermore, the coated particles were crushed in a mortar and dissolved with the addition of water, followed by filtration. The film after filtration and drying was dissolved in ortho-dichlorobenzene, and the molecular weight of the film was measured by the above-mentioned method. As a result, it was confirmed that the weight-average molecular weight was the same as that of the charged polyethylene.

Moreover, the coated granular fertilizer was subjected to the releasing test, the degradation test, the abrasion resistance test, and the shock resistance test in the same manner as above. The results are shown in Table 2.

EXAMPLE 23

A coated fertilizer was obtained in the same manner as in Example 11, except for using a dispersion of 4.95 parts by weight of polyethylene having a weight-average molecular weight of 910 and a number-average molecular weight of 520, 5 parts by weight of talc (average particle size: 10 $\mu$), and 0.05 part by weight of polyoxyethylene monostearate (HLB=8) in tetrachloroethylene. Moreover, the measurement of the molecular weight, the releasing test, the degradation test, the abrasion resistance test, and the shock resistance test were conducted in the same manner as above. The results are shown in Table 2.

COMPARATIVE EXAMPLE 4

A coated fertilizer was obtained in the same manner as in Example 11, except for using a dispersion of 2.5 parts by weight of a low-density polyethylene having a weight-average molecular weight of 95000 and a number-average molecular weight of 9500, 2.5 parts by weight of ethylene-vinyl acetate copolymer (content of vinyl acetate: 25% by weight; melt flow rate: 2 dg/min; weight-average molecular weight: 210,000), and 5 parts by weight of talc (average particle size: 10 $\mu$) in tetrachloroethylene. Moreover, the measurement of the molecular weight, the releasing test, the degradation test, the abrasion resistance test, and the shock resistance test were conducted in the same manner as above. The results are shown in Table 2.

COMPARATIVE EXAMPLE 5

A coated fertilizer was obtained in the same manner as in Example 11, except for using a solution of 2.5 parts by weight of polyethylene having a weight-average molecular weight of 910 and a number-average molecular weight of 520 and 7.5 parts by weight of ethylene-vinyl acetate copolymer (content of vinyl acetate: 25% by weight; melt flow rate: 2 dg/min; weight-average molecular weight: 210, 000) in tetrachloroethylene. Moreover, the measurement of the molecular weight, the releasing test, the degradation test, the abrasion resistance test, and the shock resistance test were conducted in the same manner as above. The results are shown in Table 2.

COMPARATIVE EXAMPLE 6

A coated fertilizer was obtained in the same manner as in Example 11, except for using a solution of 9 parts by weight of polyethylene having a weight-average molecular weight of 910 and a number-average molecular weight of 520 and 1 part by weight of ethylene-vinyl acetate copolymer (content of vinyl acetate: 25% by weight; melt flow rate: 2 dg/min; weight-average molecular weight: 210,000) in tetrachloroethylene. Moreover, the measurement of the molecular weight, the releasing test, the degradation test, the abrasion resistance test, and the shock resistance test were conducted in the same manner as above. The results are shown in Table 2.

EXAMPLE 24

A coated fertilizer was prepared using the jetting apparatus shown in FIG. 1. That is, 90 parts by weight of tetrachloroethylene was added to 4.45 parts by weight of polyethylene having a weight-average molecular weight of 910 and a number-average molecular weight of 520, 0.5 part by weight of ethylene-octene-1 copolymer (ENGAGE 8150 manufactured by DuPont Dow Elastomers Co., Ltd.; melt flow rate: 0.5 dg/min; density: 0.868 g/cm$^3$; Mw/Mn=2.3; weight-average molecular weight: 130,000), 5 parts by weight of talc (average particle size: 10 $\mu$), and 0.05 part by weight of polyoxyethylene monostearate (HLB=8), and these were refluxed under heating to the boiling point of the solvent to dissolve the components. 100 parts by weight of granular potash nitrophosphate (the components N, $P_2O_5$ and $K_2O$ were 15% each) of 3.0 mm in average particle size which was sifted to a range of 2–4 mm (fertilizer 8 in FIG. 1) was introduced into the jetting apparatus from the fertilizer inlet 6, and a jetting state was allowed to occur by blowing hot air with blower 1, orifice 2 and heater 3 so that the temperature T in the apparatus was stabilized at 60° C. Then, the above solution was supplied to the jetting apparatus from the spray nozzle 5 by the liquid supply pump 4 over a period of 8 minutes, during which time the temperature of the hot air was adjusted so that the temperature T in the jetting apparatus was within the range of 60±2° C. After completion of the supply of the solution, the hot air was replaced by cold air, and the content was taken out from the jetting apparatus when the temperature reached 35° C. or lower.

The resulting coated fertilizer was in an amount of 110 parts by weight, and it was found that nearly the whole quantity of the supplied solid matter was coated. Furthermore, the coated particles were crushed in a mortar and dissolved with the addition of water, followed by filtration. The film, after filtration and drying, was dissolved in ortho-dichlorobenzene, and the molecular weight of the film was measured by the above-mentioned method. As a result, it was confirmed that the weight-average molecular weight was the same as that of the charged polyethylene.

Moreover, the coated granular fertilizer was subjected to the releasing test, the degradation test, the abrasion resistance test, and the shock resistance test in the same manner as above. The results are shown in Table 3.

EXAMPLE 25

A coated fertilizer was obtained in the same manner as in Example 24, except for using a dispersion of 4.45 parts by weight of polyethylene having a weight-average molecular weight of 910 and a number-average molecular weight of 520, 0.5 part by weight of ethylene-octene-1 copolymer (ENGAGE 8200 manufactured by DuPont Dow Elastomers Co., Ltd.; melt flow rate: 5 dg/min; density: 0.870 g/cm$^3$; Mw/Mn=2.4; weight-average molecular weight: 70,000), 5 parts by weight of talc (average particle size: 10 $\mu$), and 0.05 part by weight of polyoxyethylene monostearate (HLB=8) in tetrachloroethylene. Moreover, the measurement of the molecular weight, the releasing test, the degradation test, the abrasion resistance test, and the shock resistance test were conducted in the same manner as above. The results are shown in Table 3.

EXAMPLE 26

A coated fertilizer was obtained in the same manner as in Example 24, except for using a dispersion of 3.95 parts by weight of polyethylene having a weight-average molecular weight of 910 and a number-average molecular weight of 520, 1 part by weight of ethylene-vinyl acetate copolymer (content of vinyl acetate: 25% by weight; melt flow rate: 2 dg/min; weight-average molecular weight: 210,000), 4 parts by weight of talc (average particle size: 10 $\mu$), 0.05 part by weight of polyoxyethylene monostearate (HLB=8), and 1 part by weight of starch (corn starch; average particle size: 20 $\mu$; passing through a 280 mesh) in tetrachloroethylene. Moreover, the measurement of the molecular weight, the releasing test, the degradation test, the abrasion resistance test, and the shock resistance test were conducted in the same manner as above. The results are shown in Table 3.

EXAMPLE 27

A coated fertilizer was obtained in the same manner as in Example 24, except for using a dispersion of 3.7 parts by weight of polyethylene having a weight-average molecular weight of 910 and a number-average molecular weight of 520, 1 part by weight of ethylene-vinyl acetate copolymer (content of vinyl acetate: 25% by weight; melt flow rate: 2 dg/min; weight-average molecular weight: 210,000), 5 parts by weight of talc (average particle size: 10 $\mu$), and 0.3 part by weight of polyethylene glycol one end of which was methylated (UNIOX M2000 manufactured by Nippon Oil & Fats Co., Ltd.; molecular weight: 2000) in tetrachloroethylene. Moreover, the measurement of the molecular weight, the releasing test, the degradation test, the abrasion resistance test, and the shock resistance test were conducted in the same manner as above. The results are shown in Table 3.

TABLE 1

| | Composition of film | | | Weight-average molecular weight | Number-average molecular weight | Degradation rate (%) | Days for release of 80% (day) | Releasing rate after 3 days (%) |
|---|---|---|---|---|---|---|---|---|
| | Polymer | Talc | Surface active agent[1] | | | | | |
| Example 1 | Polyethylene 50 | 50 | — | 630 | 580 | 98 | 250 | 4 |
| Example 2 | Polyethylene 90 | 10 | — | 1400 | 760 | 90 | 200 | 4 |
| Example 3 | Polyethylene 99.99 | — | SA1 0.01 | 630 | 580 | 94 | 180 | 16 |
| Example 4 | Polyethylene 90 | — | SA1 10 | 1400 | 760 | 92 | 40 | 17 |
| Example 5 | Polyethylene 49.5 | 50 | SA1 0.5 | 1400 | 760 | 93 | 120 | 3 |
| Example 6 | Polyethylene 59 | 40 | SA2 1.0 | 630 | 580 | 99 | 100 | 4 |
| Example 7 | Polyethylene 19.99 | 80 | SA1 0.01 | 5100 | 1600 | 85 | 90 | 10 |
| Example 8 | Paraffin wax 94 | 5 | SA1 1.0 | 530 | 330 | 100 | 80 | 25 |
| Example 9 | Polyethylene 49.5 | 50 | SA1 0.5 | 1400 | 760 | 95 | 100 | 4 |
| Example 10 | Polyethylene 59 | 40 | SA2 1.0 | 630 | 580 | 100 | 90 | 15 |
| Comparative Example 1 | Polyethylene 40 | 60 | — | 95000 | 9500 | 0 | 200 | 4 |
| Comparative Example 2 | Polycaprolactone 50 | 50 | — | 10000 | — | 100 | 30 | 35 |
| Comparative Example 3 | Polyethylene 100 | — | — | 630 | 580 | 95 | 190 | 18 |

[1]SA1: Polyoxyethylene monostearate (HLB = 8)
SA2: Polyoxyethylene nonylphenyl ether (HLB = 13)

TABLE 2

| | Composition of film (wt %) | | | | PE/Petroleum wax | | Degradation test (%) | Abrasion resistance test (%) | Shock resistance test (%) | Days for release of 80% (day) | Releasing rate after 3 days (%) |
|---|---|---|---|---|---|---|---|---|---|---|---|
| | PE/Petroleum wax | EVA | Talc | Surface active agent | Weight-average molecular weight | Number-average molecular weight | | | | | |
| Example 11 | 39.5 | 10 | 50 | 0.5 | 910 | 520 | 95 | 1 | 1 | 110 | 0 |
| Example 12 | 48 | 1 | 50 | 1.0 | 910 | 520 | 100 | 70 | 65 | 90 | 7 |
| Example 13 | 29.9 | 20 | 50 | 0.1 | 910 | 520 | 89 | 0 | 0 | 160 | 0 |
| Example 14 | 24.5 | 25 | 50 | 0.5 | 910 | 520 | 77 | 0 | 0 | 100 | 2 |
| Example 15 | 44.5 | 5 | 50 | 0.5 | 910 | 520 | 99 | 32 | 27 | 120 | 5 |
| Example 16 | 80.5 | 9 | 10 | 0.5 | 910 | 520 | 97 | 51 | 45 | 120 | 6 |
| Example 17 | 13.0 | 15 | 70 | 2.0 | 910 | 520 | 81 | 73 | 6 | 50 | 8 |
| Example 18 | 47.5 | 2 | 50 | 0.5 | 5,100 | 1,600 | 80 | 68 | 68 | 120 | 0 |
| Example 19 | 29.5 | 20 | 50 | 0.5 | 530 | 330 | 95 | 5 | 0 | 100 | 15 |
| Example 20 | 39.5 | 10 | 50 | 0.5 | 910 | 520 | 100 | 0 | 0 | 110 | 0 |
| Example 21 | 39.5 | 10 | 50 | 0.5 | 910 | 520 | 100 | 0 | 0 | 80 | 0 |
| Example 22 | 73 | 2 | 20 | 5.0 | 630 | 580 | 100 | 76 | 70 | 40 | 15 |
| Example 23 | 49.5 | — | 50 | 0.5 | 910 | 520 | 100 | 90 | 95 | 120 | 5 |
| Comparative Example 4 | 25 | 25 | 50 | — | 95,000 | 9,500 | 0 | 1 | 1 | 180 | 3 |
| Comparative Example 5 | 25 | 75 | — | — | 910 | 520 | 10 | 0 | 1 | 40 | 25 |
| Comparative Example 6 | 90 | 10 | — | — | 910 | 520 | 92 | 15 | 29 | 190 | 13 |

PE/Petroleum wax: Polyethylene or petroleum wax
EVA: Ethylene-vinyl acetate copolymer
Content of vinyl acetate: Saponification method, JIS K6730
MFR: Melt flow rate, JIS K6730

TABLE 3

| | Composition of film (wt %) | | | | | PE | | Degradation test (%) | Abrasion resistance test (%) | Shock resistance test (%) | Days for release of 80% (day) | Releasing rate after 3 days (%) |
|---|---|---|---|---|---|---|---|---|---|---|---|---|
| | PE | EVA | Talc | Surface active agent | Others | Weight-average molecular weight | Weight-average molecular weight | | | | | |
| Example 24 | 44.5 | — | 50 | 0.5 | 5 ENGAGE8150 | 910 | 520 | 100 | 1 | 1 | 220 | 0 |
| Example 25 | 44.5 | — | 50 | 0.5 | 5 ENGAGE8200 | 910 | 520 | 100 | 4 | 4 | 200 | 3 |
| Example 26 | 39.5 | 10 | 40 | 0.5 | 10 Starch | 910 | 520 | 100 | 6 | 3 | 100 | 1 |
| Example 27 | 37 | 10 | 50 | 3 | — | 910 | 520 | 100 | 0 | 0 | 80 | 2 |

PE: Polyethylene
EVA: Ethylene-vinyl acetate copolymer

INDUSTRIAL APPLICABILITY

In the coated granular fertilizer coated with a degradable film containing a polyolefin and/or petroleum wax having a specific molecular weight, an inorganic filler and/or a surface active agent according to the present invention, the film, after the release of the fertilizer, is degraded in the natural environment. Additionally, the early release can be satisfactorily inhibited, and the release can be controlled over a long period of time. Furthermore, a coated granular fertilizer, excellent in mechanical strength of the film, can be provided by additionally using an ethylene-vinyl acetate copolymer and/or a specific ethylene-α-olefin copolymer. Therefore, the coated fertilizer has a markedly high industrial value.

What is claimed is:

1. A coated granular fertilizer which is coated with a single layer coating of a degradable film containing 10% by weight or more of a polyolefin and/or petroleum wax having a weight-average molecular weight of 300–10,000, an ethylene-vinyl acetate copolymer and/or an ethylene-α-olefin copolymer having a weight-average molecular weight of 20,000 or more, a ratio of weight-average molecular weight to number-average molecular weight of 1–3 and a density of 0.8–0.9 g/cm$^3$, and/or an ethylene-vinyl acetate copolymer and an inorganic filler and/or a surface active agent, the weight ratio of the ethylene-vinyl acetate copolymer and/or ethylene-α-olefin copolymer to the polyolefin and/or petroleum wax being 0.01–2.0.

2. A coated granular fertilizer according to claim 1 which is coated with a degradable film containing 10–94% by weight of said polyolefin and/or petroleum wax having a weight-average molecular weight of 300–10,000, 1–60% by weight of said ethylene-vinyl acetate copolymer and/or an ethylene-α-olefin copolymer having a weight-average molecular weight of 20,000 or more, a ratio of weight-average molecular weight to number-average molecular weight of 1–3 and a density of 0.8–0.9 g/cm$^3$, and 5–80% by weight of an inorganic filler.

3. A coated granular fertilizer according to claim 1 which is coated with a degradable film containing 10–98.99% by weight of said polyolefin and/or petroleum wax having a weight-average molecular weight of 300–10,000, 1–60% by weight of said ethylene-vinyl acetate copolymer and/or an ethylene-α-olefin copolymer having a weight-average molecular weight of 20,000 or more, a ratio of weight-average molecular weight to number-average molecular weight of 1–3 and a density of 0.8–0.9 g/cm$^3$, and 0.01–20% by weight of a surface active agent.

4. A coated granular fertilizer according to claim 1 which is coated with a degradable film containing 10–93.99% by weight of said polyolefin and/or petroleum wax having a weight-average molecular weight of 300–10,000, 1–60% by weight of said ethylene-vinyl acetate copolymer and/or an ethylene-α-olefin copolymer having a weight-average molecular weight of 20,000 or more, a ratio of weight-average molecular weight to number-average molecular weight of 1–3 and a density of 0.8–0.9 g/cm$^3$, 5–80% by weight of an inorganic filler, and 0.01–20% by weight of a surface active agent.

5. A coated granular fertilizer according to any one of claims 1–4, wherein the polyolefin is a polyethylene.

6. A coated granular fertilizer according to claim 1 which is coated with a degradable film containing 10–93.99% by weight of a polyethylene having a weight-average molecular weight of 630–10,000, 1–47.5% by weight of an ethylene-vinyl acetate copolymer, 5–80% by weight of an inorganic filler, and 0.01–20% by weight of a surface active agent, the weight ratio of the ethylene-vinyl acetate copolymer to the polyethylene being 0.05–1.0.

7. A coated granular fertilizer according to claim 1, wherein the film contains 0.5–20% by weight of at least one biodegradable material selected from the group consisting of starch, modified starch, cereal powder, cellulose, agar, and xanthone.

8. A coated granular fertilizer according to claim 1, wherein the film contains a photodegradation accelerator containing an organometallic complex containing at least one metal selected from the group consisting of iron, cobalt, nickel, copper, manganese, silver, palladium, molybdenum, chromium, tungsten and cerium, and/or an oxidative degradation accelerator consisting of at least one member selected from the group consisting of a compound having a —C=C— unsaturated bond, a transition metal and a transition metal compound.

9. A coated granular fertilizer according to claim 8, wherein the organometallic complex is nickel dibutyldithiocarbamate and/or nickel diethyldithiocarbamate and/or an acetylacetone complex of iron, and the film contains the organometallic complex in an amount of 0.02–20×10$^{-6}$ mole/g based on the film.

* * * * *